United States Patent [19]

Melrose

[11] Patent Number: 5,172,774
[45] Date of Patent: Dec. 22, 1992

[54] AXIALLY COMPACT TORQUE TRANSDUCER

[75] Inventor: David R. Melrose, Ringoes, N.J.

[73] Assignee: Ingersoll-Rand Company, Woodcliff Lake, N.J.

[21] Appl. No.: 684,226

[22] Filed: Apr. 12, 1991

[51] Int. Cl.$^5$ ............................................. B25B 23/14
[52] U.S. Cl. ................................... 173/182; 81/469
[58] Field of Search .................... 173/12, 182; 81/467, 81/468, 469, 470

[56] References Cited

U.S. PATENT DOCUMENTS

| | | | |
|---|---|---|---|
| 1,386,455 | 8/1921 | Clemens | 81/469 |
| 1,970,179 | 8/1934 | Miller | 81/469 |
| 2,385,005 | 9/1945 | Langer | 73/136 |
| 2,893,278 | 7/1959 | Rice | 81/470 |
| 3,832,897 | 9/1974 | Schenck | 73/136 |
| 3,845,673 | 11/1974 | Kårdén et al. | 81/470 |
| 3,920,082 | 11/1975 | Dudek | 173/12 |
| 4,089,216 | 5/1978 | Elias | 73/136 |
| 4,281,538 | 8/1981 | Dudek | 73/862.21 |
| 4,418,590 | 12/1983 | Dubiel et al. | 81/467 |
| 4,487,270 | 12/1984 | Huber | 173/12 |
| 4,549,438 | 10/1985 | Grabovac et al. | 73/862.21 |
| 4,811,850 | 3/1989 | Bankuty et al. | 209/546 |
| 5,014,794 | 5/1991 | Hansson | 81/469 |

Primary Examiner—Frank T. Yost
Assistant Examiner—Scott A. Smith
Attorney, Agent, or Firm—Robert F. Palermo

[57] ABSTRACT

A high sensitivity torque transducer capable of installation between the motor and the output reduction gear train in the housing of a rotating machine, which has a limited axial space therefor, has a disk shaped first member fixed to a fixed portion of the housing. A disk shaped second member has splined coupling with the first member and the second member to provide sliding coupling with a floating portion of an output drive train. This coupling transfers reaction torque back from the output shaft, through the drive train, and into the second member. Shear webs are formed between the inner and outer diameters of the second member by removing some material to form torsion concentrator voids. Strain gages mounted on the shear webs and bridged with appropriate resistors provide an output signal in response to torsional strains imposed on the second disk shaped member. The output signal is routed to a calibrated signal processor and relay control unit.

8 Claims, 3 Drawing Sheets

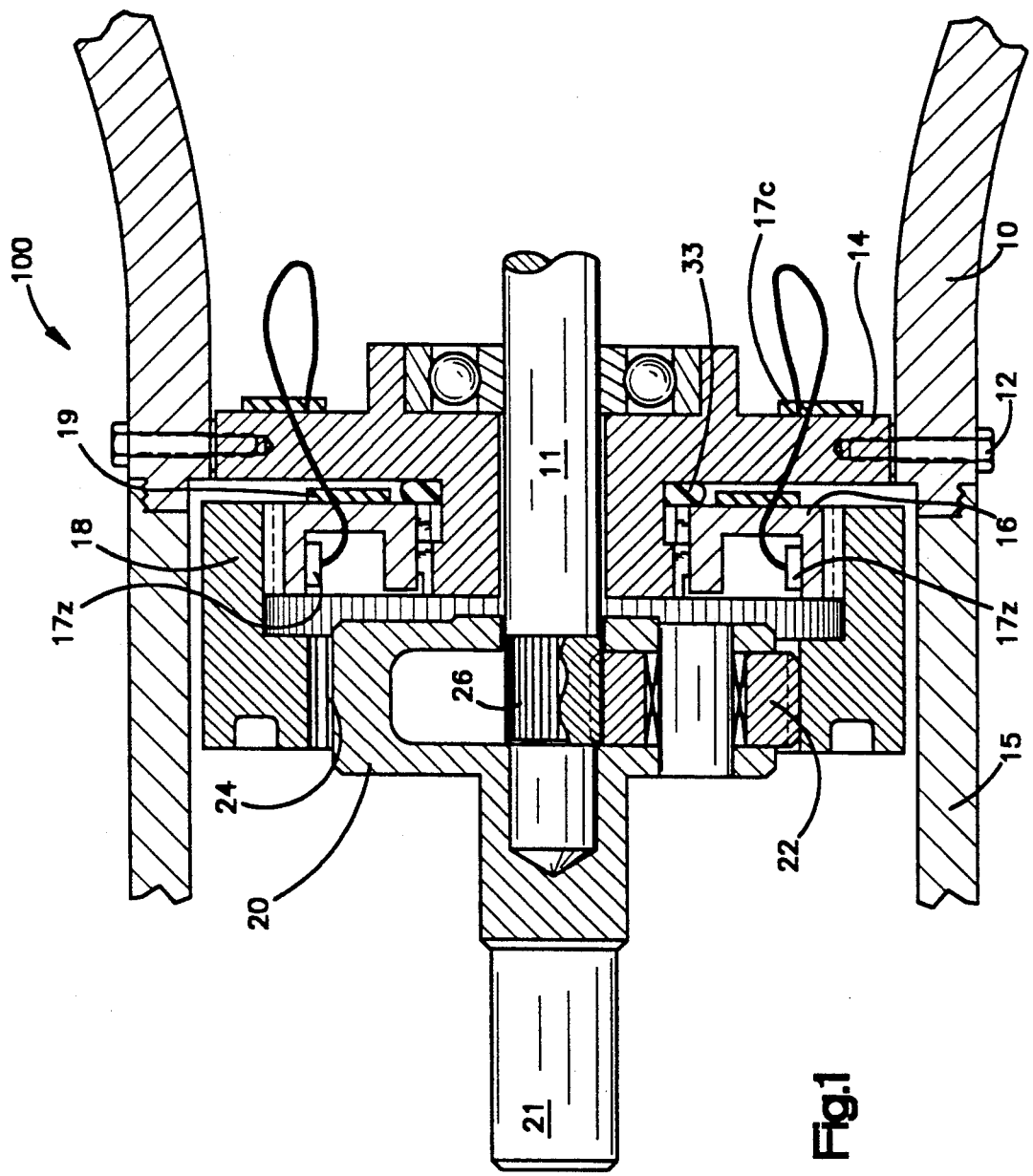

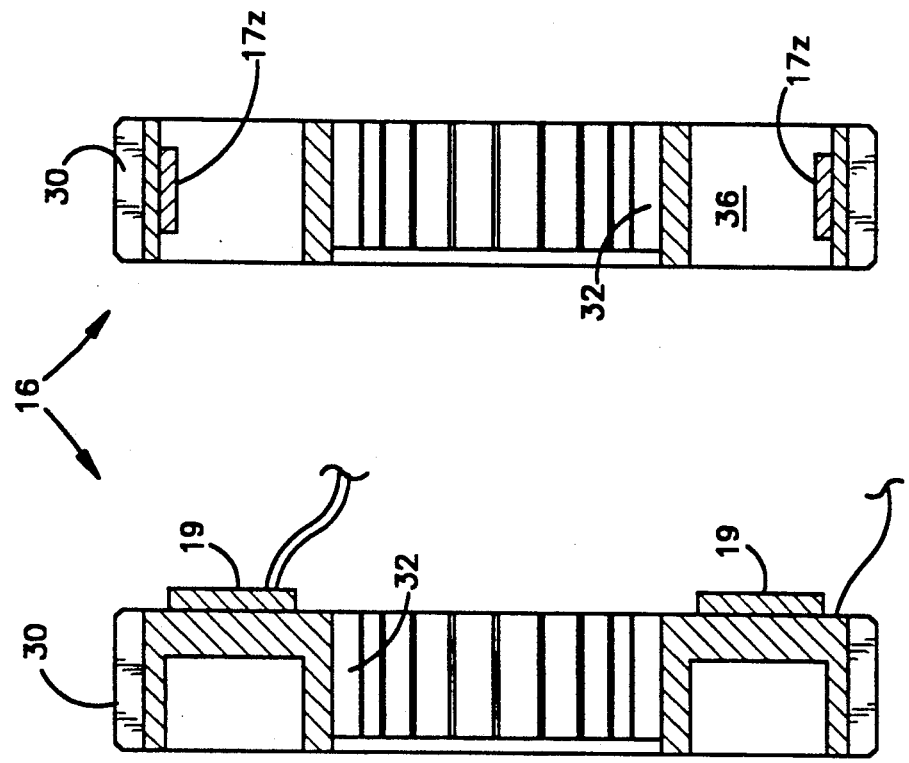
Fig.2b
Fig.2a
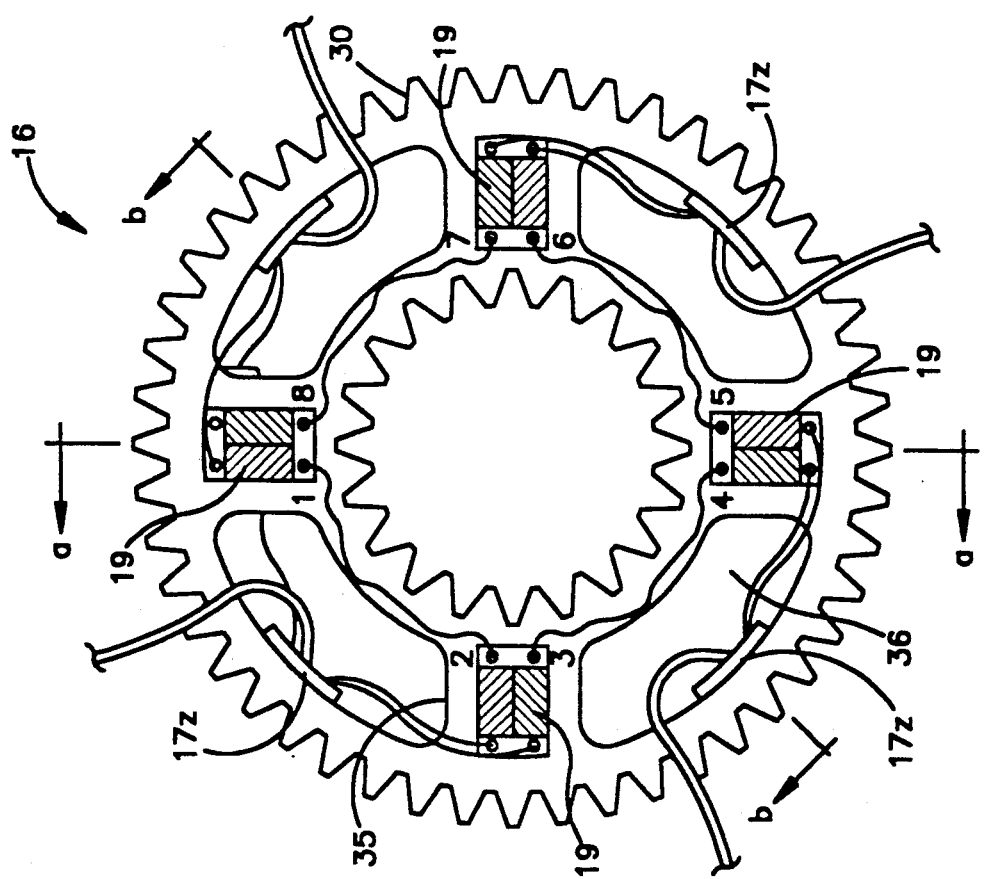
Fig.2

AXIALLY COMPACT TORQUE TRANSDUCER

BACKGROUND OF THE INVENTION

This invention relates generally to devices for monitoring stress and strain in dynamic structures and more particularly to transducers for measuring the output torque of power tools and other rotating machinery.

Monitoring of dynamic stresses and strains in power tools and other rotating machinery is often desirable. The data received from such operations permit evaluation of the performance of the equipment in question. In the case of power tools, such as nutrunners or screwdrivers, the data permit measurement of the torque output and thereby calculation of fastener tension produced by the tool. Real time feedback coupled with programmable controls makes it possible to automatically deactivate the tool power when a desired fastener tension is achieved. This provides the benefit of reproducible fastener tensioning in assembly line or other mass production operations. A variety of transducers are available for measuring torque output of rotating machines. Most such transducers are quite satisfactory for their intended applications; however, in some cases the axial dimensions of the transducer are such that their use requires an unacceptable increase in the size of the tool. When the tool must be used in a limited space environment, such size increases may be intolerable. In such cases, fastener tension can only be determined by use of tortuous tool combinations of questionable accuracy.

In addition, an excessive increase in size can contribute to increased weight and unwieldy proportions which can contribute to premature operator fatigue and otherwise degrade operator performance.

The foregoing illustrates limitations known to exist in present devices and methods. Thus, it is apparent that it would be advantageous to provide an alternative directed to overcoming one or more limitations set forth above. Accordingly, a suitable alternative is provided including features more fully disclosed hereinafter.

SUMMARY OF THE INVENTION

In one aspect of the present invention, this is accomplished by providing a high sensitivity torque transducer for low torque applications capable of installation between a drive motor and an output gear reduction drive train assembly within a housing of a rotating machine in a limited axial space. The transducer has a first substantially disk shaped member rigidly connectable to a static reference member of the housing a second substantially disk shaped member slidably connectable to the first substantially disk shaped member and also slidably connectable to a floating portion of an output drive train which experiences reaction torque proportional to an output torque. The second substantially disk shaped member is rotationally restrained with respect to the floating portion of the output drive train but is free to slide axially with respect thereto. In addition, the second substantially disk shaped member incorporates provision for concentrating torsional stresses in a zone between a radially outer portion and a radially inner portion of the second disk shaped member. Finally, a means is provided for sensing and measuring deflections within the zone of the second substantially disk shaped member at which the torsional stresses are concentrated.

The foregoing and other aspects will become apparent from the following detailed description of the invention when considered in conjunction with the accompanying drawing figures.

BRIEF DESCRIPTION OF THE DRAWINGS

FIG. 1 is a schematic partially sectional view of the transducer of the present invention coupled with a planetary reduction gear in a power tool which is fragmentarily represented;

FIG. 2 is a schematic view showing added detail of the torsion meter disk of the present invention;

FIG. 2a is a sectional view from line A—A of FIG. 2;

FIG. 2b is a sectional view from line B—B of FIG. 2;

DETAILED DESCRIPTION

Figure 4:
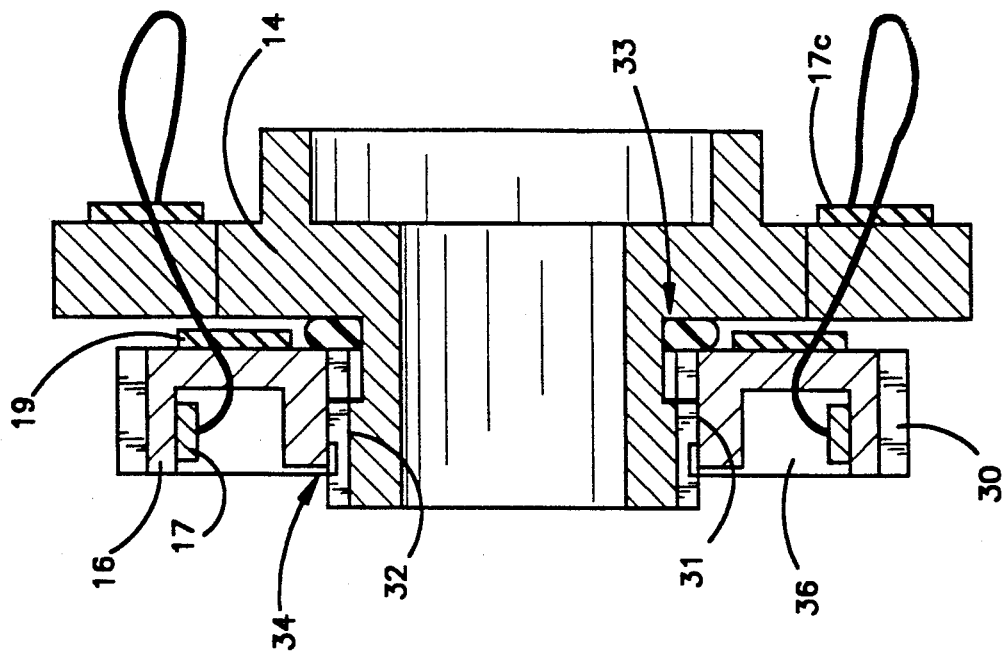
FIG. 4 is a schematic sectional view of the torque transducer assembly of the present invention.

By reference to FIG. 1, many of the features of the present invention can be seen. A representation of a portion of the housing of a power tool 100 is shown at the juncture of a motor housing 10 and a drive housing 15. Motor shaft 11 protrudes from motor housing 10 into drive housing 15 where it terminates as a sun gear 26 within a planet gear carrier 20. Sun gear 26 meshes with and drives planet gear 22, which is one of three or more planet gears within the planet gear carrier 20. Planet gear 22 precesses around ring gear 24 thereby driving planet gear carrier 20 in rotation and, thus, output shaft 21.

The components of the transducer of the present invention are shown near the right side of FIG. 1. These include reference disk 14 which is rigidly attached to motor housing 10 by means of reference disk fasteners 12. Torsion meter disk 16 is slidably engaged with reference disk 14 and with torque reaction ring 18. Torque reaction ring 18 is a substantially floating extension of ring gear 24. Also seen in this view, are strain gages 19 and resistors 17c and 17z which are used to zero and calibrate the strain gages, respectively. Resilient ring 33, also shown here, is discussed below.

During operation, motor shaft 11 rotates and causes sun gear 26 to impart rolling motion to planet gears 22. The rotating planet gears 22 travel around ring gear 24 thereby causing rotation of planet gear carrier 20 and consequent rotation of output shaft 21. Any resistance to rotation by output shaft 21 is transmitted through planet gear carrier 20 to ring gear 24 as reaction torque. Torque reaction ring 18, which is merely a splined extension of ring gear 24, must necessarily experience the same reaction torque. However, torsion meter disk 16 is splined to torque reaction ring 18 on its outside diameter and to reference disk 14 on its inside diameter. Since reference disk 14 is rigidly secured to motor housing 10, neither reference disk 14, torsion meter disk 16, nor torque reaction ring 18 are free to turn. The use of splined couplings between the components prevents development of any extraneous bending stresses within the members, thereby assuring that only torsional stresses will be measured. Thus, by preventing counter rotation of ring gear 24 and torque reaction ring 18, torsion meter disk 16 experiences the full reaction torque which is measured by strain gages 19. FIGS. 2, 2a, and 2b illustrate further detail of the torsion meter disk of the present invention. External splines 30 and internal splines 32 of torsion meter disk 16 act as the coupling agents between splines 31 of reference disk 14 (shown in FIG. 4) and torque reaction ring 18, respectively. Four shear webs 35, defined by torsion concentrator voids 36, provide the concentration of torsional strains which permits accurate sensing by strain gages 19. This concentration improves the sensitivity and accuracy of the strain measurements. Zero resistors 17z are also shown here.

Figure 3:
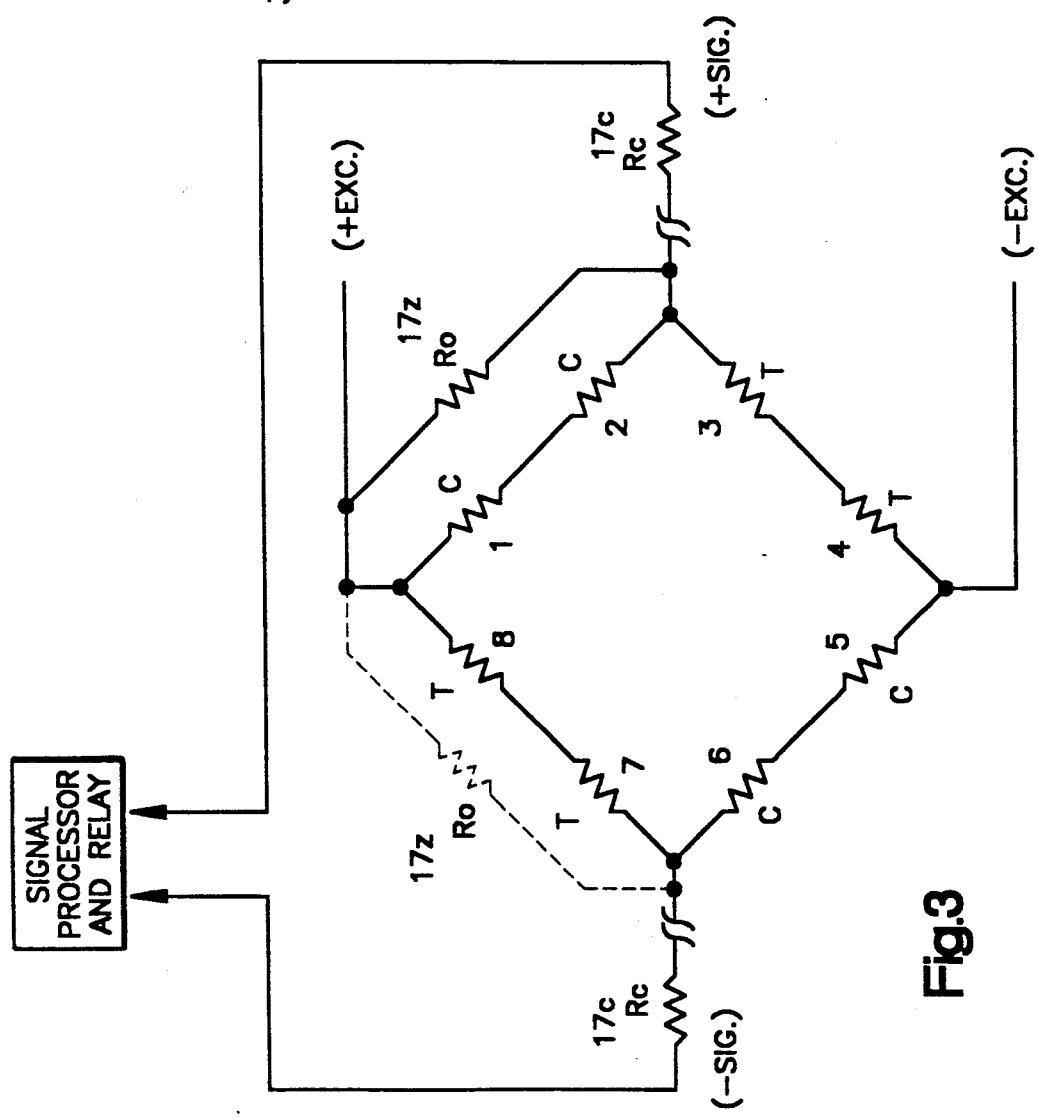
FIG. 3 is a schematic electrical diagram showing the torsion measuring bridge arrangement an indicating the signal processor and relay control unit.

FIG. 3, viewed in conjunction with FIGS. 2, 2a, and 2b, illustrates the typical strain gage/resistor bridge arrangement used in such applications. Zero resistors 17z are used to adjust the strain gage signals under zero load conditions for a correct reading on the output meter (not shown) and for errors in alignment and location of strain gages 19 on shear webs 35 as well as for slight deviations in shear web area caused by slight deviations in the size of torsion concentrator voids 36. Calibration resistors 17c, shown in FIGS. 1 and 4, are used to adjust the output signal from strain gages 19 at selected levels of strain within the transducer range of operation. The output signal of the strain gage bridge is routed to the calibrated signal processor and relay control (shown symbolically) which compares torsional strain output signals, routed from the strain gage bridge, to established standards of torque/fastener tension values and deactivates the power switch at the desired fastener tension value.

FIG. 4 illustrates further detail of the transducer assembly of the present invention. Torsion meter disk 16 is coupled to splines 31 of reference disk 14 by means of internal splines 32 on the torsion meter disk Snap ring 34 retains torsion meter disk 16 on the projection of reference disk 14, while resilient ring 33 provides a bias of the meter disk against the snap ring. This assures that, although torsion meter disk 16, is free to move axially under load, it cannot slide loosely. Strain gages 19 are mounted on the axial face of torsion meter disk 16 while resistors 17z are mounted on the inside circumference of the meter disk within torsion concentrator voids 36. Calibration resistors 17c are mounted on the back surface of reference disk 14.

The minimum sizes for the torsion meter disk 16 and the reference disk 14 are determined by the anticipated torque range of service for the transducer assembly and by the physical sizes of the resistors 17c and z and strain gages 19. Thus, this transducer provides the advantage of requiring a minimum volume for installation and, consequently, exerting minimum impact on the size and configuration of the tool in which it is employed.

What is claimed is:

1. A high sensitivity torque transducer for low torque applications capable of installation between a drive motor and an output gear reduction drive train assembly within a housing of a rotating machine in a limited axial space, comprising:
    a substantially disk shaped first member rigidly connectable to a static reference member of said housing;
    a substantially disk shaped second member slidably connectable to said first member and also slidably connectable to a floating portion of said output gear reduction drive train which experiences reaction torque proportional to an output torque, said second member being rotationally restrained with respect to said floating portion of the output drive train but free to slide axially with respect thereto, said second member further comprising means for concentrating torsional stresses in a zone lying between a radially outer portion and a radially inner portion of said second member; and
    means for sensing and measuring torsional deflections within the zone of said second member at which said torsional stresses are concentrated wherein the means for concentrating torsional stresses in a zone lying between a radially outer portion and a radially inner portion of said second member comprises an annular axially thin section together with a plurality of torsional concentrator voids which define a plurality of shear webs between said radially outer and radially inner portions.

2. The torque transducer of claim 1, wherein the means for sensing and measuring torsional deflections of the second member comprises a plurality of strain gages, one attached to each shear web.

3. The torque transducer of claim 1, wherein the means for sensing and measuring torsional deflections of the second member comprises a plurality of strain gages attached to said second member in the zone of said second member at which the torsional stresses are concentrated.

4. In a power tool of the type used for driving threaded fasteners and having a housing containing a motor and a switch for activating the motor for producing rotary motion, the improvement comprising:
    a high sensitivity torque transducer for low torque applications capable of installation in a limited axial space between the motor and an output gear reduction drive train, said torque transducer comprising:
    a substantially disk shaped first member rigidly connected to a static portion of said housing;
    a substantially disk shaped second member slidably coupled to said first member and also slidably coupled to a floating portion of an output drive train which experiences reaction torque proportional to an output torque of said power tool, said second member being rotationally restrained with respect to said floating portion of said output drive train and having means for concentrating torsional stresses in a radially intermediate zone of said second member; and
    means for sensing and measuring torsional deflections of the zone of said second member in which said torsional stresses are concentrated and for generating a proportional output signal;
    means for converting said torsional deflection measurement output signals into tool torque output values for indicating fastener tension; and
    means for interrupting motor power to said power tool when said tool torque output values indicate that a desired fastener tension has been attained,
    wherein the means for concentrating torsional stresses in a radially intermediate zone of the second member comprises an annular axially thin section and a plurality of torsional concentrator voids which define a plurality of shear webs within said radially intermediate zone.

5. The improvement in the power tool of claim 4, wherein the means for sensing and measuring torsional deflections in the zone of said second member in which said torsional stresses are concentrated comprises a plurality of strain gages, one attached to each of said plurality of shear webs.

6. The improvement in the power tool of claim 4, wherein the means for sensing and measuring torsional deflections within the zone of said second member in which said torsional stresses are concentrated comprises a plurality of strain gages attached to the second member within said zone of said second member.

7. The improvement in the power tool of claim 4, wherein the means for converting said torsional deflection measurements into output torque values for indicating fastener tension comprises a calibrated electronic signal processor.

8. The improvement in the power tool of claim 4, wherein the means for interrupting drive power to said power tool comprises an electronically operated relay, coupled with said means for converting said torsional deflection measurement output signals into tool torque output values for indicating fastener tension, for deactivating the switch of said tool.

* * * * *